(12) United States Patent
Laurila

(10) Patent No.: US 12,135,385 B2
(45) Date of Patent: Nov. 5, 2024

(54) SYSTEM AND METHOD FOR TRANSMITTING INFORMATION FROM SYNTHETIC APERTURE RADAR SATELLITE TO CLIENT RECEIVER

(71) Applicant: ICEYE OY, Espoo (FI)

(72) Inventor: Pekka Laurila, Espoo (FI)

(73) Assignee: ICEYE OY, Espoo (FI)

( * ) Notice: Subject to any disclaimer, the term of this patent is extended or adjusted under 35 U.S.C. 154(b) by 44 days.

(21) Appl. No.: 17/900,274

(22) Filed: Aug. 31, 2022

(65) Prior Publication Data

US 2022/0413089 A1    Dec. 29, 2022

Related U.S. Application Data

(63) Continuation of application No. 15/685,349, filed on Aug. 24, 2017, now Pat. No. 11,460,535.

(51) Int. Cl.
*G01S 7/00* (2006.01)
*G01S 7/527* (2006.01)
*G01S 13/90* (2006.01)

(52) U.S. Cl.
CPC ............... *G01S 7/006* (2013.01); *G01S 7/527* (2013.01); *G01S 13/90* (2013.01)

(58) Field of Classification Search
CPC .......... G01S 7/003; G01S 7/006; G01S 7/527; G01S 13/751; G01S 13/5252; G01S 13/9029

(Continued)

(56) References Cited

U.S. PATENT DOCUMENTS 4,727,373 A * 2/1988 Hoover ............... G01S 13/9058
244/167
5,248,979 A * 9/1993 Orme ..................... G01S 13/90
398/121

(Continued)

FOREIGN PATENT DOCUMENTS

CN        104932004 A       9/2015

OTHER PUBLICATIONS

Extended European Search Report issued in related European Patent Application No. 22180985.8 dated Oct. 4, 2022.

(Continued)

*Primary Examiner* — Vladimir Magloire
*Assistant Examiner* — Michael W Justice
(74) *Attorney, Agent, or Firm* — DENTONS US LLP

(57) ABSTRACT

A system and a method for transmitting information from a synthetic aperture radar satellite to a client receiver. In one aspect, the synthetic aperture radar satellite includes a processing unit configured to form information from a previously measured synthetic aperture radar raw data stored in a data storage; a modulator configured to modulate the information to a synthetic aperture radar transmission signal; a transmitter for transmitting the modulated synthetic aperture radar transmission signal. The processing unit is configured to suppress the modulation from a received echo signal of the modulated synthetic aperture radar transmission signal to form and store a synthetic aperture radar raw data in the data storage. The client receiver includes an antenna for receiving the transmitted modulated synthetic aperture radar transmission signal; and a demodulator configured to demodulate the received transmitted modulated synthetic aperture radar transmission signal to obtain the information.

20 Claims, 3 Drawing Sheets

(58) Field of Classification Search
USPC .................. 342/25, 25 A, 25 R, 58, 352
See application file for complete search history.

(56) References Cited

U.S. PATENT DOCUMENTS

| | | | | |
|---|---|---|---|---|
| 6,175,326 | B1* | 1/2001 | Kare | G01S 13/904 |
| | | | | 342/25 R |
| 6,864,828 | B1 | 3/2005 | Golubiewski | |
| 7,199,750 | B2* | 4/2007 | Bourdelais | G01S 13/003 |
| | | | | 342/107 |
| 7,812,758 | B2* | 10/2010 | Morris | G01S 7/006 |
| | | | | 342/25 A |
| 7,911,372 | B2* | 3/2011 | Nelson | G01S 13/86 |
| | | | | 342/25 R |
| 9,076,332 | B2* | 7/2015 | Myr | G08G 1/04 |
| 9,134,414 | B2 | 9/2015 | Bergeron et al. | |
| 9,274,219 | B2* | 3/2016 | Lamb | G01S 13/904 |
| 9,344,994 | B2 | 5/2016 | Herz | |
| 9,779,301 | B2 | 10/2017 | Herz | |
| 9,971,062 | B2* | 5/2018 | Platzer | G01W 1/10 |
| 10,230,925 | B2 | 3/2019 | Maciejewski | |
| 10,338,215 | B2 | 7/2019 | Murata | |
| 10,379,260 | B2* | 8/2019 | Platzer | H04B 7/18513 |
| 10,620,304 | B2* | 4/2020 | Halbert | G01S 7/003 |
| 11,385,347 | B2* | 7/2022 | Maschhoff | H04B 7/195 |
| 11,506,778 | B2* | 11/2022 | Fox | G01S 13/282 |
| 2006/0238407 | A1* | 10/2006 | Bourdelais | G01S 13/003 |
| | | | | 342/195 |
| 2008/0094250 | A1* | 4/2008 | Myr | G08G 1/081 |
| | | | | 340/909 |
| 2010/0039313 | A1* | 2/2010 | Morris | G01S 13/28 |
| | | | | 342/25 R |
| 2011/0040521 | A1 | 2/2011 | Gur | |
| 2011/0148691 | A1 | 6/2011 | Samanieg | |
| 2012/0119943 | A1 | 5/2012 | Bergeron et al. | |
| 2013/0009807 | A1* | 1/2013 | Lamb | G01S 13/904 |
| | | | | 342/25 B |
| 2013/0201050 | A1* | 8/2013 | Hellsten | G01S 7/03 |
| | | | | 342/21 |
| 2014/0009326 | A1 | 1/2014 | Wishart | |
| 2014/0009327 | A1 | 1/2014 | Schaefer | |
| 2014/0266857 | A1 | 9/2014 | Mayer | |
| 2015/0192696 | A1* | 7/2015 | Platzer | G01W 1/10 |
| | | | | 342/26 A |
| 2015/0204974 | A1 | 7/2015 | Pillay | |
| 2015/0257126 | A1 | 9/2015 | Herz | |
| 2015/0323665 | A1 | 11/2015 | Murata | |
| 2015/0323666 | A1 | 11/2015 | Murata | |
| 2015/0346336 | A1 | 12/2015 | DiGiorgio | |
| 2016/0094637 | A1 | 3/2016 | Hackathorn | |
| 2016/0232400 | A1 | 8/2016 | Herz | |
| 2017/0285158 | A1* | 10/2017 | Halbert | G01S 7/414 |
| 2018/0259639 | A1* | 9/2018 | Rubel | G01S 13/9054 |
| 2018/0356516 | A1* | 12/2018 | Fox | G01S 13/90 |
| 2018/0364393 | A1* | 12/2018 | Platzer | G06Q 10/02 |
| 2020/0142055 | A1* | 5/2020 | Fox | G01S 13/9011 |
| 2020/0150268 | A1* | 5/2020 | Maschhoff | G01S 13/955 |

OTHER PUBLICATIONS

PCT International Written Opinion and Search Report for related PCT/FI2018/050554 dated Oct. 8, 2018, 15 pages.
PCT International Preliminary Report on Patentability for related PCT/FI2018/050554 dated Feb. 25, 2020, 9 pages.

* cited by examiner

SYSTEM AND METHOD FOR TRANSMITTING INFORMATION FROM SYNTHETIC APERTURE RADAR SATELLITE TO CLIENT RECEIVER

RELATED APPLICATION DATA

This application is a continuation of U.S. patent application Ser. No. 15/685,349 filed Aug. 24, 2017, the entirety of which is incorporated herein by reference to the extent permitted by law.

TECHNICAL FIELD

The present disclosure relates generally to satellite communications, and more specifically, to a system and a method for transmitting information from a synthetic aperture radar satellite to a client receiver.

BACKGROUND

Satellite communication has become an important source of information for obtaining images of one or more regions of a geographical area. Typically, a grid of satellites orbits around the earth and transmits information related to the one or more regions of the geographical area to an earth based ground station. The grid of satellites is a constellation of satellites and can include tens or hundreds of micro or nano-satellites. Out of various known technologies, synthetic aperture radar (SAR) based satellites are effective and efficient satellites. The SAR is a form of a radar that uses motion of a radar antenna over a targeted region to render finer spatial resolution of the targeted region. The synthetic aperture radar satellite is generally mounted on a moving platform such as an aircraft or spacecraft.

In an existing method of retrieving information from the grid of satellites, a client receiver, intending to receive information regarding the specific region of the geographical area, submits a request for information to the ground station. The ground station establishes a communication with the respective satellite and in turn, the satellite transmits information regarding the specific region of the geographical area to the ground station. Subsequently, the ground station may process the received information and delivers the processed information to the client receiver. However, the existing method becomes ineffective due to a relatively longer response time to deliver information at the client receiver. The response time is critical when the client receiver requires information in real time. For example, if a troubled sea vessel configured with the client receiver requires information regarding its surroundings, firstly this request will be sent to the ground station. On receiving the request, the ground station establishes communication with the grid of satellites which scan the surroundings of the sea vessel using the SAR technique and transmits the information (e.g. scanned image of the landscape) to the ground station. This communication establishes a delay as the one or more satellites of the grid may have to arrive into a suitable orbital position for communication. Thereafter, the ground station communicates the information to the sea vessel. Consequently, the troubled sea vessel may not receive the required information in a timely manner.

Further, the micro or nano-satellites installed in the grid of satellites have limited power transmission capabilities. As a result, the grid of satellites cannot deliver information to remote ground stations and range of the geographical area as captured by the grid of satellites is severely affected. Moreover, an increase in a number of ground stations is required to increase the range of the grid of satellites, which itself requires a substantial amount of financial and human resources.

Therefore, in light of the foregoing discussion, there exists a need to overcome the aforementioned drawbacks of the relatively long response time to the request for information and limited processing capabilities of the ground stations.

SUMMARY

The present disclosure seeks to provide a method for transmitting information from a synthetic aperture radar satellite to a client receiver.

The present disclosure also seeks to provide a system for transmitting information from a synthetic aperture radar satellite to a client receiver.

The present disclosure seeks to provide a solution to the existing problem of a relatively longer response time to receive information from the synthetic aperture radar satellite. An aim of the present disclosure is to provide a solution that overcomes at least partially the problems encountered in prior art, and provides an improved communication from the synthetic aperture radar satellite to the client receiver especially in arctic regions wherein telecom bandwidth is generally quite limited, is difficult to deliver information to the client receiver.

In one aspect, an embodiment of the present disclosure provides a method for transmitting information from a synthetic aperture radar satellite to a client receiver, the method comprising steps of:
  using a previously stored synthetic aperture radar raw data from a data storage to form the information;
  modulating a synthetic aperture radar transmission signal to carry the information;
  transmitting the modulated synthetic aperture radar transmission signal from the synthetic aperture radar satellite;
  receiving the modulated synthetic aperture radar transmission signal with the client receiver and demodulating the modulated synthetic aperture radar transmission to obtain the information;
  receiving an echo signal of the modulated synthetic aperture radar transmission signal in the synthetic aperture radar satellite, wherein the receiving comprises steps of:
    processing the received echo signal of the modulated synthetic aperture radar transmission signal for suppressing the modulation (i.e., demodulating the received echo signal);
    forming a synthetic aperture radar raw data from the processed echo signal; and
    storing the synthetic aperture radar raw data in the data storage for further use.

In another aspect, an embodiment of the present disclosure provides a system for transmitting information from a synthetic aperture radar satellite to a client receiver, comprising:
  the synthetic aperture radar satellite, comprising:
    a data storage configured to store a previously measured synthetic aperture radar raw data
    a processing unit configured to form the information from the stored previously measured synthetic aperture radar raw data;
    a modulator configured to modulate the information to a synthetic aperture radar transmission signal;

a transmitter for transmitting the modulated synthetic aperture radar transmission signal; and a receiver for receiving an echo signal of the modulated synthetic aperture radar transmission signal;

wherein the processing unit is further configured to suppress the modulation from (i.e., demodulate) the received echo signal of the modulated synthetic aperture radar transmission signal;

form a synthetic aperture radar raw data from the received echo signal from which the modulation is suppressed (i.e., the demodulated received echo signal); and store the synthetic aperture radar raw data in the data storage;

the client receiver, comprising:

an antenna for receiving the transmitted modulated synthetic aperture radar transmission signal; and a demodulator configured to demodulate the received transmitted modulated synthetic aperture radar transmission signal to obtain the information.

Embodiments of the present disclosure substantially eliminate or at least partially address the aforementioned problems in the prior art, and enables a direct, a power efficient and an effective communication between the synthetic aperture radar satellite and the client receiver.

Additional aspects, advantages, features and objects of the present disclosure would be made apparent from the drawings and the detailed description of the illustrative embodiments construed in conjunction with the appended claims that follow.

It will be appreciated that features of the present disclosure are 10 susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
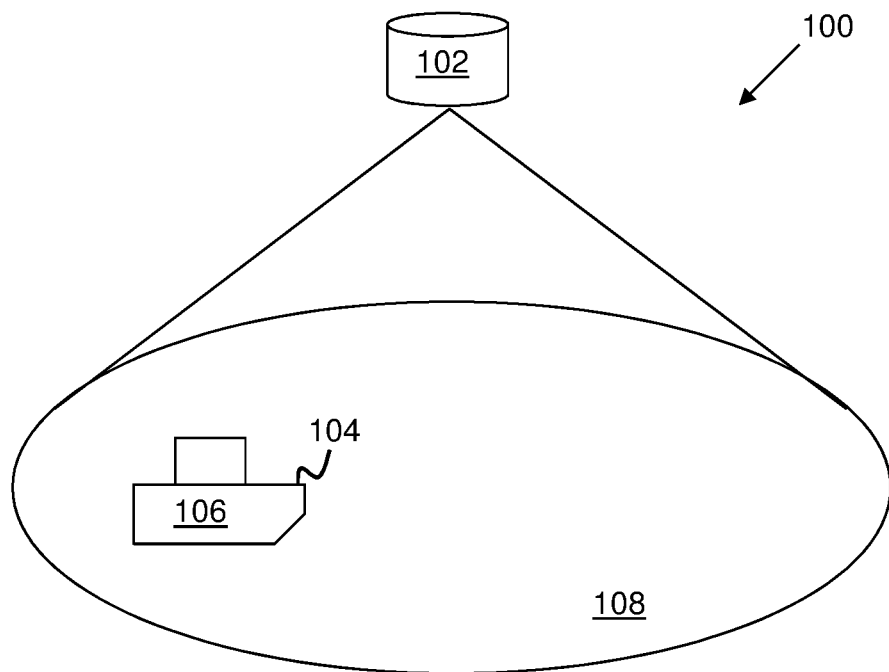
FIG. 1 is a schematic illustration of a system for transmitting information from a synthetic aperture radar satellite to a client receiver, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is 25 used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method for transmitting information from a synthetic aperture radar satellite to a client receiver, the method comprising steps of:

using a previously stored synthetic aperture radar raw data from a data storage to form the information;

modulating a synthetic aperture radar transmission signal to carry the information;

transmitting the modulated synthetic aperture radar transmission signal from the synthetic aperture radar satellite;

receiving the modulated synthetic aperture radar transmission signal with the client receiver and demodulating the modulated synthetic aperture radar transmission to obtain the information;

receiving an echo signal of the modulated synthetic aperture radar transmission signal in the synthetic aperture radar satellite, wherein the receiving comprises steps of:

processing the received echo signal of the modulated synthetic aperture radar transmission signal for suppressing the modulation (i.e., to demodulate the received echo signal);

forming a synthetic aperture radar raw data from the processed echo signal; and storing the synthetic aperture radar raw data in the data storage for further use.

In another aspect, an embodiment of the present disclosure provides a system for transmitting information from a synthetic aperture radar satellite to a client receiver, comprising:

the synthetic aperture radar satellite, comprising:

a data storage configured to store a previously measure synthetic aperture radar raw data;

a processing unit configured to form the information from the stored previously measured synthetic aperture radar raw data;

a modulator configured to modulate the information to a synthetic aperture radar transmission signal;

a transmitter for transmitting the modulated synthetic aperture radar transmission signal; and a receiver for receiving an echo signal of the modulated synthetic aperture radar transmission signal;

wherein the processing unit is further configured to suppress the modulation from (i.e., demodulate) the received echo signal of the modulated synthetic aperture radar transmission signal;

form a synthetic aperture radar raw data from the received echo signal from which the modulation is suppressed (i.e., the demodulated received echo signal); and store the synthetic aperture radar raw data in the data storage;

the client receiver, comprising:

an antenna for receiving the transmitted modulated synthetic aperture radar transmission signal; and a demodulator configured to demodulate the received transmitted modulated synthetic aperture radar transmission signal to obtain the information.

The present disclosure provides several advantages in establishing a direct communication between the synthetic aperture radar satellite and the client receiver. Unlike in the prior art method, the client receiver can directly receive the information regarding objects, landscapes and the like from the synthetic aperture radar satellite. The direct communication between the synthetic aperture radar satellite and the client receiver substantially reduces response time of the system to deliver information to the client receiver. Therefore, the present disclosure achieves both objectives firstly remote sensing of the landscapes as a normal operation of the synthetic aperture radar satellite and secondly, communicating recently acquired images of the landscapes directly to the client receiver.

In an embodiment, the synthetic aperture radar satellite can be a part of a grid of satellites which uses the respective synthetic aperture radars for mapping surfaces of landscapes or objects in one or more regions of a geographical area and storing these maps in a form of the image data in the data storage. Whenever the client receiver is within a range of the grid of satellites, the client receiver receives updated image data regarding the one or more regions of a geographical area from the grid of satellites. In an embodiment, the data storage can include and is not limited to transitory or non-transitory storage mediums such as magnetic tapes, hard disks, optical disks, solid state memories (e.g., read only memory (ROM), random access memory (RAM)) and other storage devices.

Typically, the synthetic aperture radar transmission signal is transmitted toward one or more regions of the geographical area in order to sense the landscapes or objects located therein. The echoes of the transmitted synthetic aperture radar transmission signal are received at the synthetic aperture radar satellite which stores the echoes in the form of raw data and retransmit the raw data to the ground station to extract information regarding the landscapes or objects. However, the synthetic aperture radar satellite of the present disclosure includes a processing unit to suppress the echoes and generate synthetic aperture radar raw data. Subsequently, the processing unit of the synthetic aperture radar satellite is configured to form information from the synthetic aperture radar raw data and modulate a synthetic aperture radar transmission signal to carry the information. The processing unit is configured to transmit the modulated synthetic aperture radar transmission signal from the synthetic aperture radar satellite directly to the client receiver. The client receiver includes an antenna for receiving the transmitted modulated synthetic aperture radar transmission signal; and a demodulator configured to demodulate the received transmitted modulated synthetic aperture radar transmission signal to obtain the information.

In an embodiment, the processing unit is configured to extract image data from the synthetic aperture radar raw data and form the information from the image data so that the client receiver which lacks high processing capabilities or is not configured to receive the synthetic aperture radar raw data, can directly access the information. Subsequently, the processing unit is configured to modulate the synthetic aperture radar transmission signal to carry the information and transmit the modulated synthetic aperture radar transmission signal toward the client receiver. Subsequently, the client receiver demodulates the received transmitted modulated synthetic aperture radar transmission signal to obtain the information which is in the form of the image data.

In an embodiment, the image data can include information regarding reflective value corresponding to each pixel of an image. Since a size of the image data is a relatively large and cannot be transmitted to the client receiver in a single pulse of communication due to limited bandwidth and speed of the disclosed synthetic aperture radar satellite communication method, the processing unit is configured to perform at least one operation on the image data to alter the size of the image data. For example, the processing unit may crop the synthetic aperture radar image, decimate the synthetic aperture radar image, filter the synthetic aperture radar image or perform a similar operation to reduce the size of the synthetic aperture radar image.

In another embodiment, the processing unit is configured to employ one or more signal processing methods to generate derive data and form the information from the derived data. The derived data may include identification and location of various objects such as other shipping vessels, mountains, sea ice signatures, ice bergs, oil spills, and the like in the one or more regions of the geographical area.

The system includes the signal generator configured to generate the synthetic aperture radar transmission signal so that the modulator is configured to modulate the information to the synthetic aperture radar transmission signal. In an embodiment, the modulator includes means for modulating the information on top of a carrier which is used in measurements. Subsequently, the modulated synthetic aperture radar transmission signal is amplified using a power amplifier and transmitted directly toward the client receiver using the transmitter.

In an embodiment, the modulator is configured to modulate the information into the synthetic aperture radar transmission signal using one or more modulation methods such as a frequency modulation, a pulse position modulation or a phase modulation. For example, the modulator is configured to encode the information into the synthetic aperture radar transmission signal using the at least one of a frequency modulation, a pulse position modulation and a phase modulation.

In an embodiment, a selection of the modulation method from the one or more modulation methods depends on processing requirements of the modulated synthetic aperture radar transmission signal either at the synthetic aperture radar satellite or at the client receiver. For example, if the modulated synthetic aperture radar transmission signal is a transmission pulse of for example a 60 MHz wide chirp lasting $\frac{1}{5000}$ s (200 microseconds) with centre frequency around 10 GHz, the power amplifier stage of the synthetic aperture radar satellite may be driven to saturation frequently. Therefore, the modulator does not use an amplitude modulation of the information into the synthetic aperture radar transmission signal.

In an embodiment, the client receiver may require one or more properties of the modulated synthetic aperture radar transmission signal in order to identify small side lobes in a radiation pattern of the modulated synthetic aperture radar transmission signal after matched filtering process. Thus, the modulator is configured to select digital modulation methods such as the pulse position modulation and the phase modulation.

In an embodiment, the modulator uses the pulse position modulation for modulating the information into the synthetic aperture radar transmission signal. In the digital modulation method such as the pulse modulation method, a term symbol is used wherein the symbol comprises one or more bits. Any data transmission in the digital modulation method is equivalent to transmission of the symbols. In other words, the transmission data includes a sequence of the symbols and each symbol may have multiple states depending on a number of bits chosen to represent the symbol. For example, in a quadrature phase shift keying modulation method, the symbol can have four different states.

In an embodiment of the pulse position modulation method, the symbol is represented using 10 bits and thus each symbol can have 1024 different states. Further, each evenly long chirp may start 0.1 micro seconds apart from each other in the pulse position modulation method. There are 256 different start positions and each transmitted chirp carries 8 bits of the information. Further, each chirp can be an up-chirp or a down-chirp which is represent by an additional bit. Further the transmission chirp may additionally include phase shifting options which can be added depending on the bandwidth needed in the modulated synthetic aperture radar transmission signal.

In an embodiment, the modulated synthetic aperture radar transmission signal includes a 60 MHz linear chirps in X-band (8-12 GHz) with a repetition rate of 5 kHz and 10% duty cycle. In other words, for each pulse period, the synthetic aperture radar satellite transmits for 10 percent of the pulse period and listens for 90 percent of the pulse period. As an example, each pulse of the modulated synthetic aperture radar transmission signal may include 1-1000 bits of the information required to be delivered toward the client receiver.

In an embodiment, a transmission timing to transmit the modulated synthetic aperture radar transmission signal from the synthetic aperture radar satellite to the client receiver is determined using a spatial location of the client receiver and a spatial location of the synthetic aperture radar satellite. For example, the spatial locations of the client receiver and the synthetic aperture radar satellite is determined using a global positioning system. In an embodiment, the transmitter of the synthetic aperture radar satellite determines whether the synthetic aperture radar satellite is in a location near to the client receiver. If a positive determination is made, the transmitter of the synthetic aperture radar satellite initiates the transmission of the modulated synthetic aperture radar transmission signal.

In an embodiment, the transmission timing is determined based on a directional pattern of a transmission antenna of the synthetic aperture radar satellite. The directional pattern of the transmission antenna includes a main lobe and one or more side lobes. Once the positions of the client receiver and synthetic aperture radar satellite are determined, the transmitter further determines whether the client receiver is in an area covered by the main lobe or by the one or more side lobes. In an embodiment, the transmitter transmits the modulated synthetic aperture radar transmission signal only when the client receiver is found to be present in the area covered by the main lobe. In another embodiment, the transmitter transmits the modulated synthetic aperture radar transmission signal toward the client receiver when the client receiver is found present in an area covered by at least one side lobe of the one or more side lobes, where a signal strength of the modulated synthetic aperture radar transmission signal is above a threshold value. In a yet another embodiment, the transmitter does not transmit the modulated synthetic aperture radar transmission signal when the client receiver is in an area where the signal strength of the modulated synthetic aperture radar transmission signal is below the threshold value.

The client receiver includes the antenna for receiving the transmitted modulated synthetic aperture radar transmission signal. As the modulated synthetic aperture radar transmission signal is transmitted with high power, typically several kilowatts, the client receiver may not require a high gain antenna which is typically used in the satellite communication.

In an embodiment, the client receiver includes processing capabilities to process large amount of data. For example, if the modulated synthetic aperture radar transmission signal includes 60 MHz linear chirps in x-band (8-12 GHz) with a repetition rate of 5 kHz, a duty cycle of 10%, a width (d) of the receivable beam 22.5 Km, a speed of the synthetic aperture radar satellite 7.5 km/s, the synthetic aperture radar satellite traverses a distance d in approximately 3 seconds. In this case, the client receiver will receive around 15000 pulses in the period of 3 seconds. Thus, the client receiver may receive 15 Kbits to 15 Mbits if each pulse of the modulated synthetic aperture radar transmission signal includes 1-1000 bits of encoded information and accordingly, process the modulated synthetic aperture radar transmission signal to obtain the information.

The client receiver includes the demodulator configured to demodulate the received modulated synthetic aperture radar transmission signal to obtain the information. Depending on the modulation method used in modulating the information into the synthetic aperture radar transmission signal at the synthetic aperture radar satellite, the client receiver is configured to select a respective demodulation unit to demodulate the modulated synthetic aperture radar transmission signal.

In an embodiment, as the synthetic aperture radar satellite travels at a fast speed, a Doppler effect may be significant affecting the received signal characteristics at the client receiver. In case, the speed of the synthetic aperture radar satellite is substantially constant and pre-known, the Doppler effect is fairly straightforward to compensate for. Thus, the client receiver includes a signal processing unit configured to compensate Doppler effect in the received modulated synthetic aperture radar transmission signal.

In an embodiment, the client receiver includes a communication interface to provide the obtained information. The communication interface can include a user interface such as a graphical user interface or a radar screen where the information is displayed to the user.

In an embodiment, a vessel with the client receiver may be located in an area such as an arctic region, where a poor communication network exists.

The vessel may require information regarding iceberg/other vessel information from an area of interest around the vessel. Once the location of the vessel is known, the transmitter of the synthetic aperture radar satellite transmits the modulated synthetic aperture radar transmission signal when the synthetic aperture radar satellite is within a reception range of the vessel. The modulated synthetic aperture radar transmission signal may include the information such as a decimated or a coarse map of the area surrounding the vessel. The client receiver receives the modulated synthetic aperture radar transmission signal and extracts the information which is displayed on the radar of the client receiver. The received map can be larger than the radar of the vessel and thus aids in route calculation for the vessel so as to avoid the icebergs.

In addition to deliver information to the client receiver through the modulated synthetic aperture radar transmission signal, the synthetic aperture radar satellite includes a receiver for receiving the echo signal of the modulated synthetic aperture radar transmission signal. The synthetic aperture radar satellite includes a processing unit which is configured to suppress the modulation from (i.e., demodulate) the received echo signal of the modulated synthetic aperture radar transmission signal.

In an embodiment, the suppression of the modulation (i.e., the demodulation) includes selecting a suppression (i.e., demodulation) algorithm based on the used modulation method in the modulated synthetic aperture radar transmission signal corresponding to the received echo signal. In an embodiment, the signal generator of the synthetic aperture radar satellite is in communication with the processing unit to deliver information related to the modulation method used in the modulated synthetic aperture radar transmission signal. Since the signal generator is aware of the various parameters in the modulated synthetic aperture radar transmission signal and timely communicates these parameters to the processing unit, the processing unit can select suitable means to compensate/suppress the effect that the signal generator has caused.

In an embodiment, the signal generator communicates to the processing unit regarding changes made in the modulated synthetic aperture radar transmission signal. For example, a change in pulse timing of the modulated synthetic aperture radar transmission signal means that the received echo signal of the modulated synthetic aperture radar transmission signal can have a spatially translation position. The spatially translated position is dependent on the speed of the satellite and other parameters which are required to be considered to generate the image data from the synthetic aperture radar raw data extracted from the echo signal of the modulated synthetic aperture radar transmission signal. Subsequently, information is generated from the image data and transmitted toward the client receiver.

Due to changes made in the modulated synthetic aperture radar transmission signal, signal parameters of the echoes of the transmitted synthetic aperture radar transmission signal remains changed. In an embodiment, the processing unit is configured to store the changed parameters of the transmitted synthetic aperture radar transmission signal in the data storage and send the changed parameters of the transmitted synthetic aperture radar transmission signal to the client receiver while transmitting the modulated synthetic aperture radar transmission signal toward the client receiver. A receipt of the changed parameters of the synthetic aperture radar transmission signal enables the client receiver to demodulate the received transmitted modulated synthetic aperture radar transmission signal to obtain the information from the synthetic aperture radar raw data.

In another embodiment, the processing unit is configured to utilize complex signal processing means for example in the matched filter stage of the receiver if the signal generator uses frequency modulation or the phase modulation while modulating the information into the synthetic aperture radar transmission signal. As the signal generator timely communicates these changes to the processing unit, the processing unit is configured to switch to a required suppression algorithm to suppress the echo signal of the modulated synthetic aperture radar transmission signal.

In an embodiment, the communication between the signal generator and the processing unit enables the synthetic aperture radar satellite to perform regular operations of a scanner to produce the synthetic aperture radar raw data.

In an embodiment, the processing unit is configured to suppress the modulation from (i.e., demodulate) the received echo signal in a real-time manner. In another embodiment, the processing unit is configured to store the modulation related parameters as received from the signal generator, raw data, Doppler effect compensation and suppress the modulation from (i.e., demodulate) the received echo signal at a later time. However, the processing unit is configured to suppress the modulation (i.e., demodulate) with a minimal delay so that the client receiver receives the information in a timely manner. The suppression (i.e., demodulation) results in formation of the synthetic aperture radar raw data and the processing unit is configured to form the image data from the raw data using one or more signal processing methods.

In an embodiment, the processing unit is configured to store the synthetic aperture radar raw data as well as image data in the data storage. Subsequently, the stored synthetic aperture radar raw data or the image data is used for transmitting the information to the client receiver depending on the processing capabilities or configuration settings of the client receiver using the methods as described above.

DETAILED DESCRIPTION OF THE DRAWINGS

Referring to FIG. 1, illustrated is a schematic illustration of a system 100 for transmitting information from a synthetic aperture radar satellite 102 to a client receiver such as a vessel 104, in accordance with an embodiment of the present disclosure. The synthetic aperture radar satellite 102 is installed on an aircraft or a spacecraft and the vessel 104 is adapted to include a client receiver 106. The vessel 104 is found within a communication range of the synthetic aperture radar satellite 102. A user may require information regarding the landscape of an area 108 in which the vessel 104 is located. The client receiver 106 submits a request to the synthetic aperture radar satellite 102 for the information and the synthetic aperture radar satellite 102 directly communicates the synthetic aperture radar transmission signal to the client receiver 106. The client receiver 106 processes the received synthetic aperture radar transmission signal and extracts the information indicating the landscape of the area 108.

Figure 2:
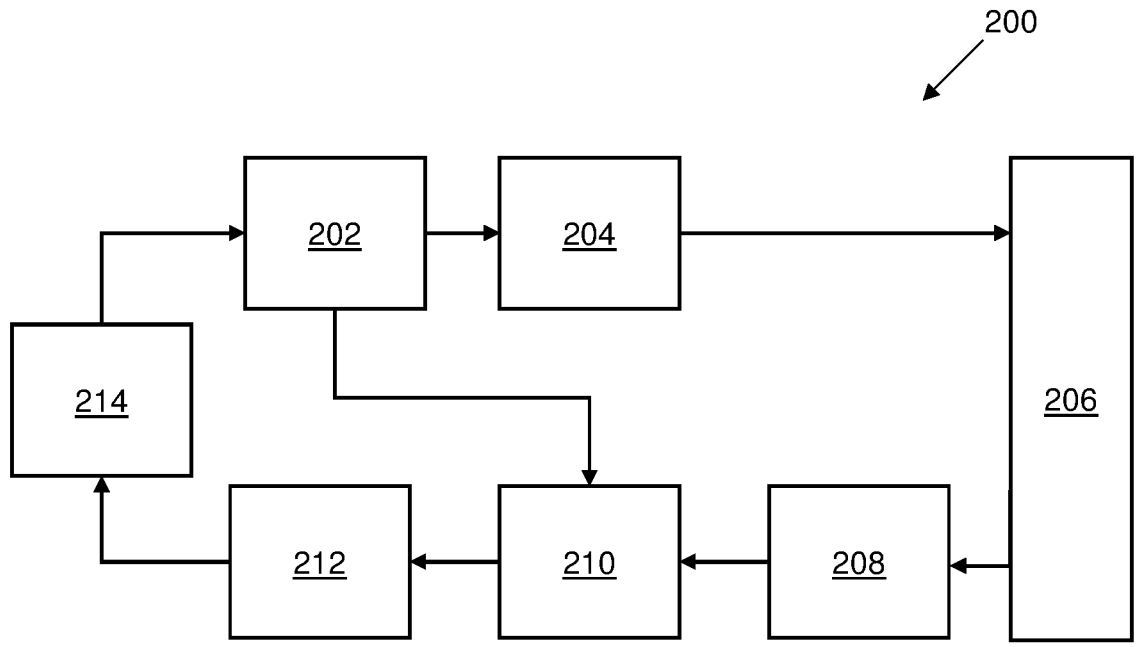
FIG. 2 is a schematic illustration of various modules of the synthetic aperture radar satellite, in accordance with an embodiment of the present disclosure.

Referring to FIG. 2, illustrated is a schematic illustration of various modules of the synthetic aperture radar satellite 200, in accordance with an embodiment of the present disclosure. The synthetic aperture radar satellite includes a modulator 202, a transmission power amplifier 204, and a transmitting (Tx)/receiving (Rx) antenna 206. The synthetic aperture radar satellite 200 further includes a low noise receiver 208 to receive an echo signal, a signal processor 210 configured to process the received echo signal and extract the synthetic aperture radar raw data from the processed echo signal. Thereafter the synthetic aperture radar raw data is stored in a data storage 212.

The synthetic aperture radar satellite 200 includes a signal generator 214 which provides synthetic aperture radar raw data in the form of a synthetic aperture transmission signal to the modulator 202 where the synthetic aperture radar raw data is modulated into a modulated synthetic aperture radar transmission signal to carry information comprising the synthetic aperture radar raw data. Further, the modulator 202 is communicatively coupled to the signal processor 210 so that modulation related data such as type of modulation, pulse width and the like can be provided to the signal processor 210. The signal processor 210 uses the modulation related data to demodulate the received echo signal in order to extract the synthetic aperture radar raw data.

Figures 3, 4:
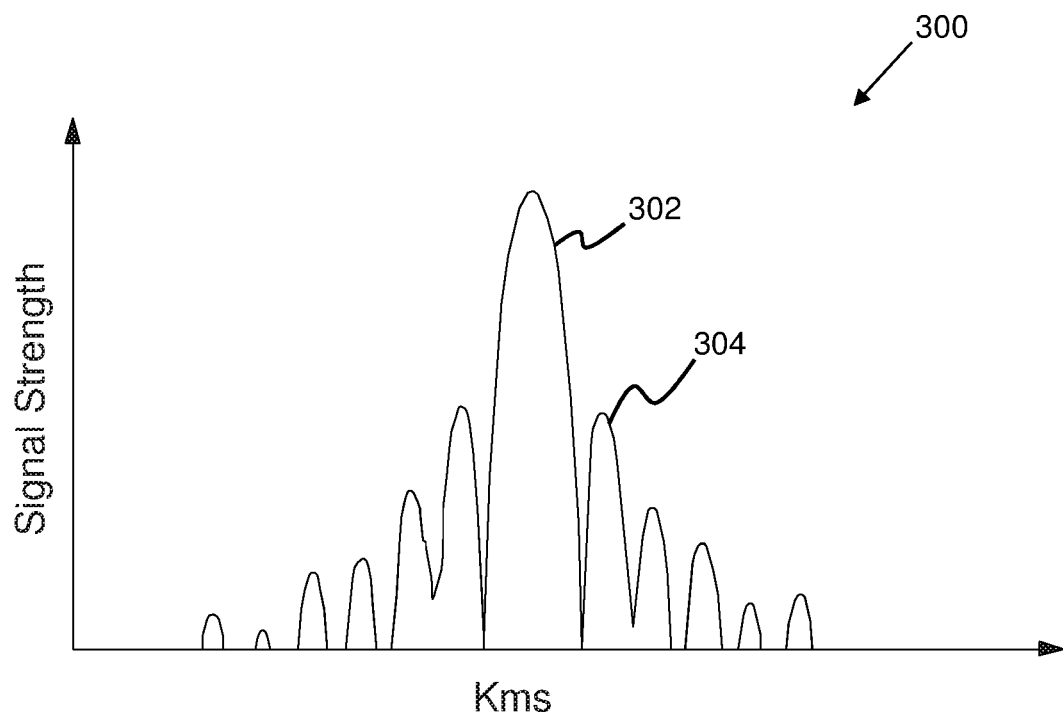
FIG. 3 is a schematic illustration of a synthetic aperture radar transmission signal pattern as received at a client receiver, in accordance with an embodiment of the present disclosure.
FIG. 4 is a schematic illustration of a table indicating orbital parameters of the synthetic aperture radar satellite, in accordance with an embodiment of the present disclosure.

Referring to FIG. 3, illustrated is an example schematic illustration of a synthetic aperture radar transmission signal pattern 300 as received at a client receiver, in accordance with an embodiment of the present disclosure. The X-axis indicates distance in kilometres and a Y-axis indicates logarithmic signal strength in dB. The synthetic aperture radar transmission signal pattern is of a signal pattern of a synthetic aperture radar satellite orbiting at a height of 500 kms. A width of the main lobe 302 is 20 Km and a strength of first lobe 304 is 13 dB which is less than a strength of the main lobe 302.

Referring to FIG. 4, illustrated is a schematic illustration of a table 400 indicating orbital parameters of the synthetic aperture radar satellite, in accordance with an embodiment of the present disclosure. The orbit parameters include height of the orbit, orbit length, speed of the synthetic aperture radar satellite and orbit time of the synthetic aperture radar satellite.

Figure 5:
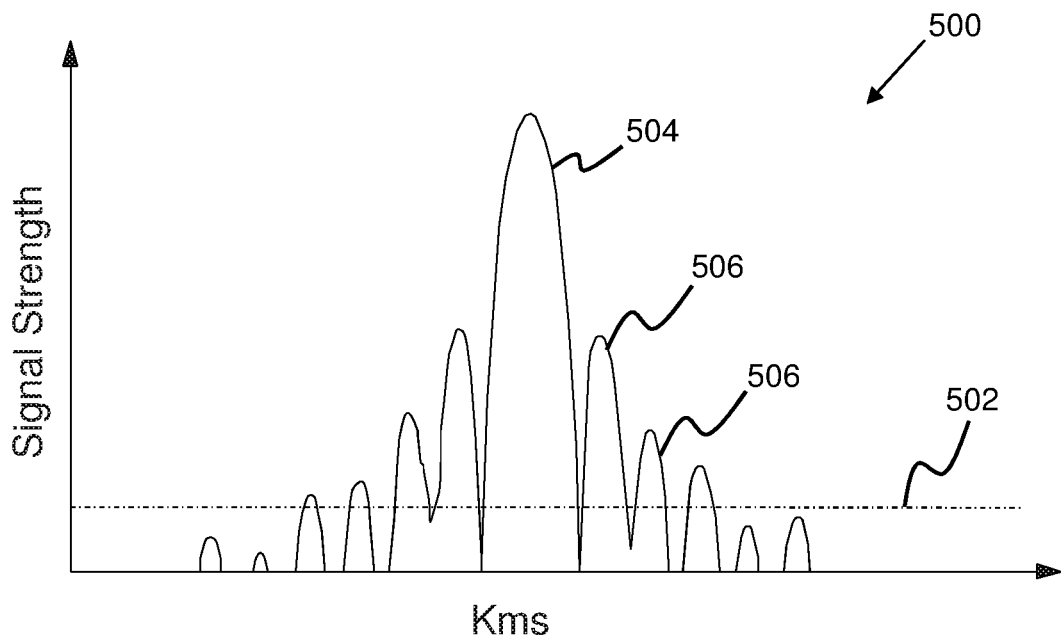
FIG. 5 is a schematic illustration of a directional pattern of a transmitting antenna of the synthetic aperture radar satellite, in accordance with an embodiment of the present disclosure.

Referring to FIG. 5, illustrated is an example schematic illustration of a directional pattern 500 of a transmitting antenna of the synthetic aperture radar satellite, in accordance with an embodiment of the present disclosure. An X-axis of the directional pattern 500 illustrates distance and a Y axis illustrates strength of a synthetic aperture radar transmission signal. A dotted line 502 indicates a threshold strength value of the modulated synthetic aperture radar transmission signal. The directional pattern of the transmission antenna includes a main lobe 504 and one or more side lobes 506. Once the positions of the client receiver and synthetic aperture radar satellite are determined, the transmitter transmits the modulated synthetic aperture radar transmission signal toward the client receiver when the client receiver is found present in an area wherein a signal strength of the modulated synthetic aperture radar transmission signal is above the dotted line 502 and the transmitter does not transmit the modulated synthetic aperture radar transmission signal when the client receiver is in an area where the signal strength of the modulated synthetic aperture radar transmission signal is below the dotted line 502.

Figure 6:
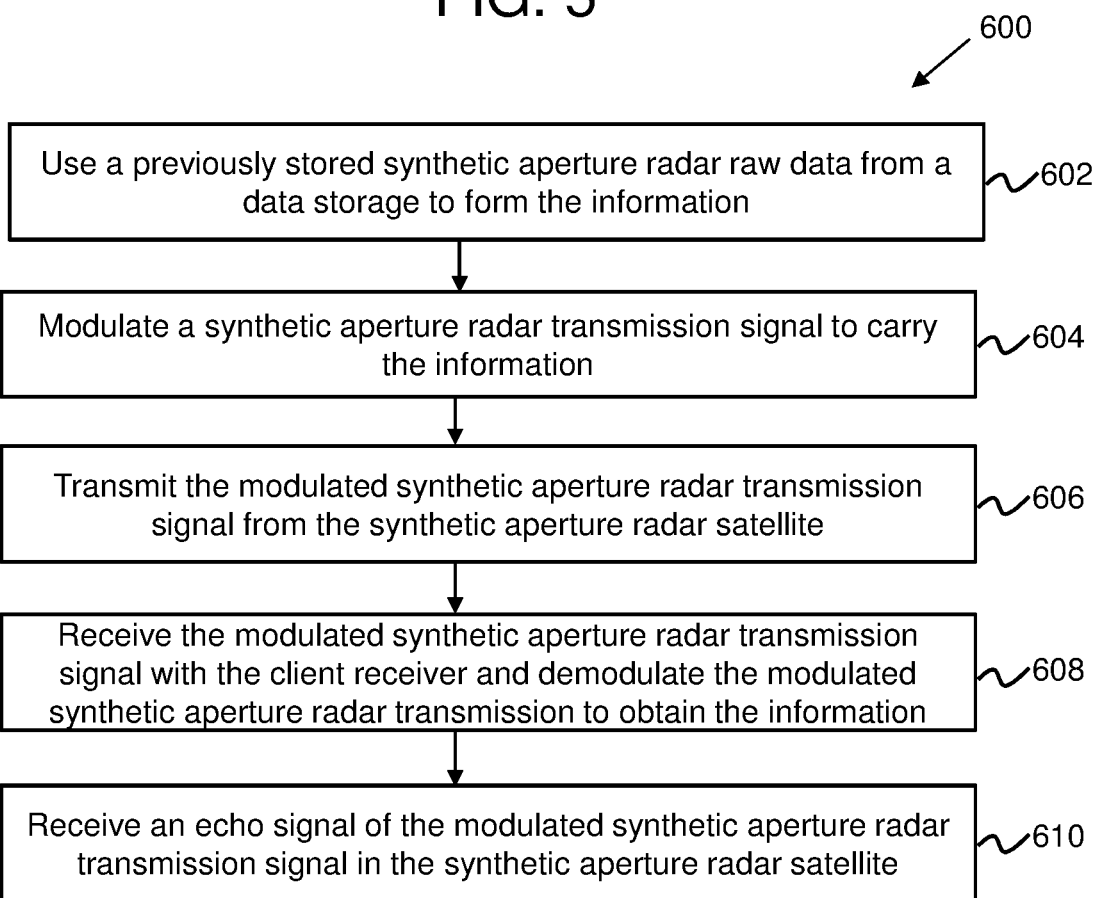
FIG. 6 is a schematic illustration of steps of a method for transmitting information from a synthetic aperture radar satellite to a client receiver, in accordance with an embodiment of the present disclosure.

Referring to FIG. 6, illustrated is an illustration of steps of a method 600 for transmitting information from a synthetic aperture radar satellite to a client receiver, in accordance with an embodiment of the present disclosure. At step 602, a previously stored synthetic aperture radar raw data from a data storage is used to form the information. At step 604, synthetic aperture radar transmission signal is modulated to carry the information. At step 606, the modulated synthetic aperture radar transmission signal from the synthetic aperture radar satellite is transmitted. At step 608, the modulated synthetic aperture radar transmission signal is received with the client receiver and the modulated synthetic aperture radar transmission is demodulated to obtain the information. At step 610, an echo signal of the modulated synthetic aperture radar transmission signal is received in the synthetic aperture radar satellite. The step of receiving the echo signal comprises processing the received echo signal of the modulated synthetic aperture radar transmission signal for suppressing the modulation; forming a synthetic aperture radar raw data from the processed echo signal; and storing the synthetic aperture radar raw data in the data storage for further use.

The steps 602 to 610 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method for transmitting information from a synthetic aperture radar satellite, the method comprising:
retrieving synthetic aperture radar raw data stored in a data storage and forming the information using the synthetic aperture radar raw data;
modulating a synthetic aperture radar transmission signal using the information and a modulation method to generate a modulated synthetic aperture radar transmission signal where the information is in the modulation of the modulated synthetic aperture radar transmission signal;
determining a transmission timing, at the synthetic aperture radar satellite or in tasking of the synthetic aperture radar satellite, for transmitting the modulated synthetic aperture radar transmission signal from the synthetic aperture radar satellite to a client receiver taking into consideration a spatial location of the client receiver, a spatial location of the synthetic aperture radar satellite, and a directional pattern of a transmission antenna of the synthetic aperture radar satellite; and
transmitting, from the synthetic aperture radar satellite, the modulated synthetic aperture radar transmission signal according to the determined transmission timing, wherein,
the directional pattern of the transmission antenna comprises a main lobe and at least one side lobe,
the determining a transmission timing comprises determining (a) when the client receiver is in an area covered by the main lobe or the at least one side lobe and (b) when a signal strength of the modulated synthetic aperture radar transmission signal is above a threshold value.

2. The method of claim 1 comprising receiving the modulated synthetic aperture radar transmission signal via the client receiver and demodulating the modulated synthetic aperture radar transmission to obtain the information.

3. The method of claim 2, wherein receiving of the modulated synthetic aperture radar transmission signal via the client receiver comprises compensating for a Doppler effect in the modulated synthetic aperture radar transmission signal.

4. The method of claim 1, further comprising:
receiving an echo signal of the modulated synthetic aperture radar transmission signal in the synthetic aperture radar satellite;
processing the echo signal received in the synthetic aperture radar including demodulating the echo signal;
forming new synthetic aperture radar raw data; and
storing the new synthetic aperture radar raw data in the data storage.

5. The method of claim 4, wherein demodulating the echo signal comprises selecting an algorithm based on the modulation method used in modulating the transmitted modulated synthetic aperture radar transmission signal.

6. The method of claim 1, wherein forming the information comprises extracting image data from the synthetic aperture radar raw data.

7. The method of claim 1, wherein forming the information comprises processing the synthetic aperture radar raw data and generating derived data.

8. The method of claim 1, wherein modulating of the synthetic aperture radar transmission signal comprises encoding the information into the synthetic aperture radar transmission signal using frequency modulation, pulse position modulation, or phase modulation.

9. A synthetic aperture radar satellite, comprising:
an antenna;
a data storage storing synthetic aperture radar raw data;
a signal generator having an input in communication with the data storage to form information from the synthetic aperture radar raw data;
a modulator having an input in communication with an output of the signal generator to modulate a synthetic aperture radar transmission signal using the information and a modulation method to generate a modulated synthetic aperture radar transmission signal where the information is in the modulation of the modulated synthetic aperture radar transmission signal;
a transmitter having an input in communication with a first output of the modulator and an output in communication with the antenna to transmit, via the antenna, the modulated synthetic aperture radar transmission signal with a transmission timing determined at the synthetic aperture radar satellite or in tasking of the synthetic aperture radar satellite based on a spatial location of a client receiver, a spatial location of the synthetic aperture radar satellite and a directional pattern of the antenna;
a receiver having an input in communication with the antenna to receive an echo signal of the modulated synthetic aperture radar transmission signal; and
a signal processor having a first input in communication with an output of the receiver and a second input in communication with a second output of the modulator to extract new synthetic aperture radar raw data from the echo signal,
wherein,
the directional pattern of the antenna comprises a main lobe and at least one side lobe,
the determining of the transmission timing comprises determining (a) when a client receiver is in an area covered by the main lobe or the at least one side lobe and (b) when a signal strength of the modulated synthetic aperture radar transmission signal is above a threshold value.

10. A synthetic aperture radar satellite according to claim 9, wherein the signal processor:
has an output in communication with the data storage;
demodulates the echo signal and forms a demodulated echo signal;
forms the new synthetic aperture radar raw data from the demodulated echo signal; and
stores the new synthetic aperture radar raw data in the data storage.

11. A system for transmitting information from a synthetic aperture radar satellite to a client receiver, comprising:
a synthetic aperture radar satellite according to claim 9; and
a client receiver including (a) an antenna via which the modulated synthetic aperture radar transmission signal can be received, and (b) a demodulator to demodulate the modulated synthetic aperture radar transmission signal received via the antenna to obtain the information from the modulated synthetic aperture radar transmission signal.

12. The system of claim 11, wherein the client receiver further comprises a signal processor to compensate for a Doppler effect in the modulated synthetic aperture radar transmission signal.

13. The system of claim 11, wherein the client receiver further comprises a communication interface via which the information obtained from the modulated synthetic aperture radar transmission signal can be expressed.

14. The system of claim 11, wherein the signal generator extracts image data from the synthetic aperture radar raw data to form the information.

15. The system of claim 11, wherein the modulator modulates the synthetic aperture radar transmission signal using frequency modulation, pulse position modulation, or phase modulation.

16. A system for transmitting information from a synthetic aperture radar satellite to a client receiver, comprising:
a synthetic aperture radar satellite according to claim 10; and
a client receiver including (a) an antenna via which the modulated synthetic aperture radar transmission signal can be received, and (b) a demodulator controlled to demodulate the modulated synthetic aperture radar transmission signal received via the antenna to obtain the information from the modulated synthetic aperture radar transmission signal.

17. A system according to claim 16, wherein the client receiver further comprises a signal processor configured to compensate for a Doppler effect in the modulated synthetic aperture radar transmission signal.

18. The system of claim 16, wherein the client receiver further comprises a communication interface via which the information obtained from the modulated synthetic aperture radar transmission signal can be expressed.

19. The system of claim 16, wherein the signal generator is controlled to extract image data from the synthetic aperture radar raw data to form the information.

20. The system of claim 16, wherein the modulator modulates the synthetic aperture radar transmission signal using frequency modulation, pulse position modulation, or phase modulation.

* * * * *